Aug. 13, 1929.  W. J. PEARMAIN  1,724,361
CLUTCH
Filed June 13, 1927   2 Sheets-Sheet 2

Witness
Martin H. Olsen

Inventor
William J. Pearmain
By Rector Hibben Davis Macauley
Atty's

Patented Aug. 13, 1929.

1,724,361

UNITED STATES PATENT OFFICE.

WILLIAM J. PEARMAIN, OF RACINE, WISCONSIN, ASSIGNOR TO THE TWIN DISC CLUTCH COMPANY, OF RACINE, WISCONSIN, A CORPORATION OF WISCONSIN.

CLUTCH.

Application filed June 13, 1927. Serial No. 198,344.

My invention relates to clutches of that construction in which an intermediate friction disk is engaged by clamping disks arranged on the respective opposite sides thereof, and movable into and out of engagement therewith. The friction disk is commonly attached to the driving member and the clamping disks rotatable with the driven member, and are so shown and described herein though this is not essential. My invention provides a clutch of this character in which springs are interposed in the connection for engaging and disengaging the clamping disks in such manner that they determine the pressure between the disks when engaged. The greatest smoothness and uniformity of operation is thus secured and the frequent and accurate adjustment, necessary with clutches in which the engagement is positive, is dispensed with. Other features and advantages of my invention will appear from the following description of the preferred embodiment of the invention and the accompanying drawings illustrating the same.

Figure 1:
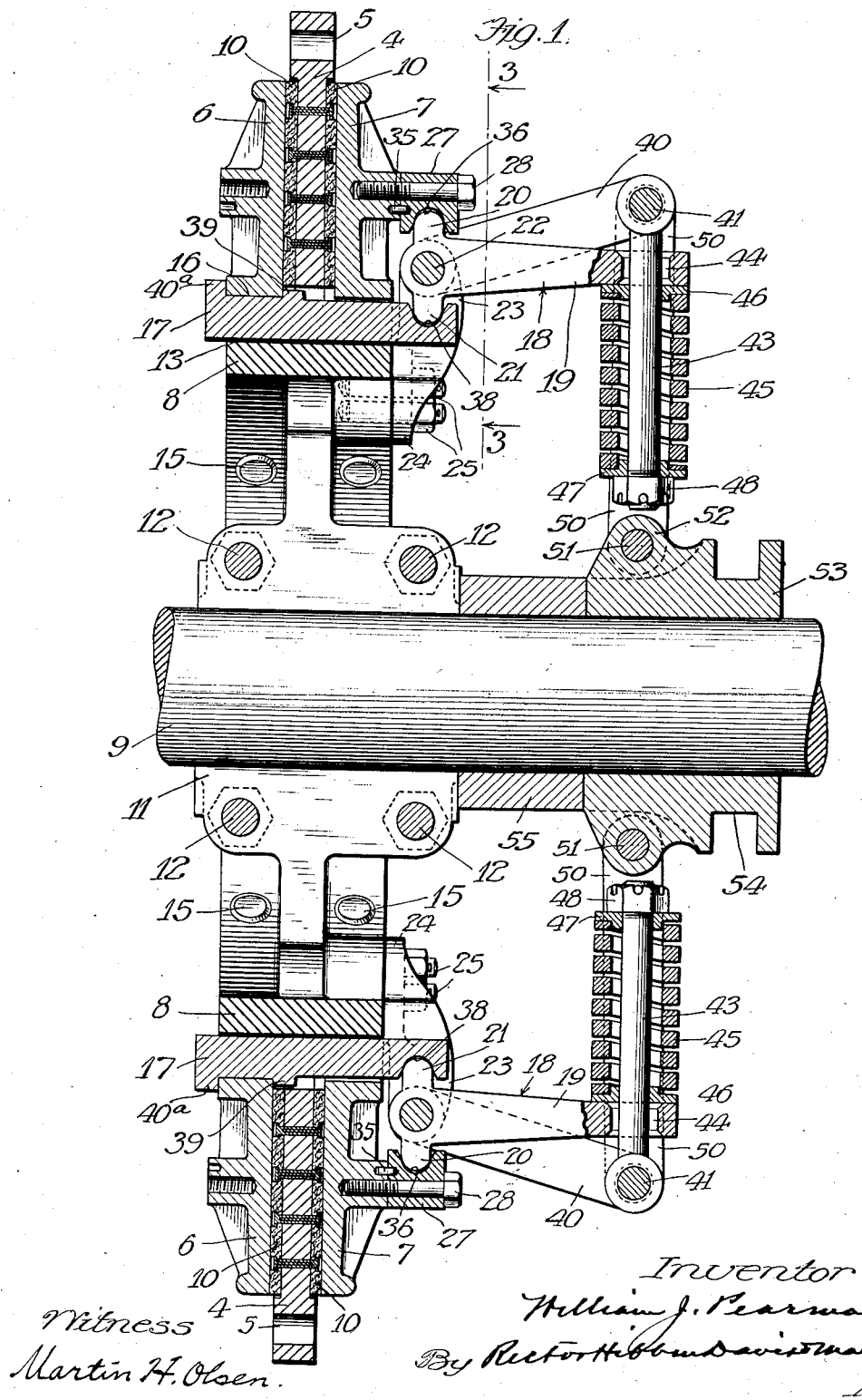
Figure 2:
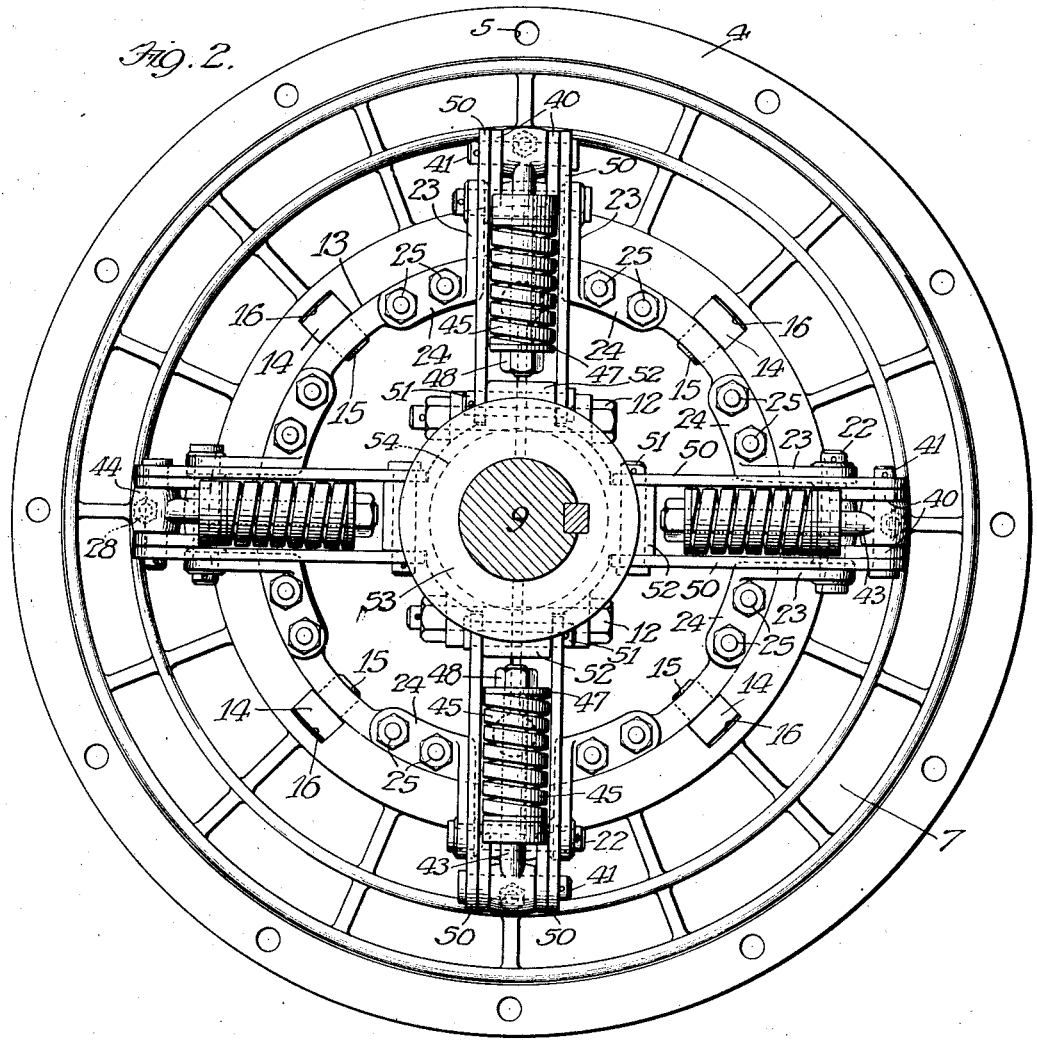
Figure 3:
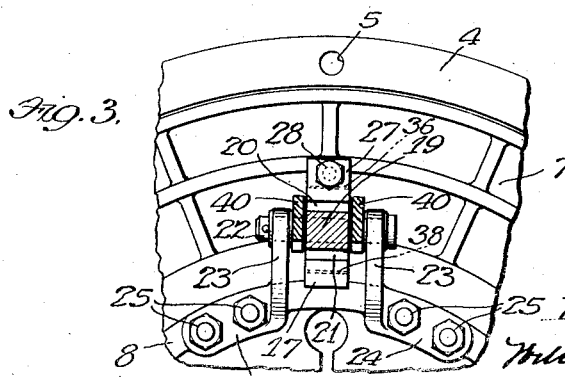

In the drawings accompanying and forming a part of this specification, Figure 1 is an axial sectional view through a clutch embodying the preferred form of my invention; Fig. 2 is a face view thereof, the shaft to which it is attached being shown in section; and, Fig. 3 is a fragmentary view in section on line 3—3 of Fig. 1. Each part is identified by the same reference character wherever it appears in the several views.

In the specific embodiment of the invention shown in the drawings, the friction disk 4 is provided with holes 5 for attachment to the fly wheel of an engine and the clamping disks 6, 7 on opposite sides respectively thereof are keyed to a hub 8 adapted to be attached to a shaft 9 to be driven by the engine through the clutch. The friction disk is provided with the usual facings 10 of friction material.

The hub as shown is formed with a split sleeve 11 for receiving the shaft 9, bolts 12 being provided for drawing the halves of the sleeve together to clamp them upon the shaft. The outer periphery of the hub is cylindrical as at 13 and provided with driving keys 14, here shown as four in number, for forming a driving connection between the hub and clamping disks, which keys are anchored on the hub periphery by dowels 15 extending therethrough.

The clamping disks 6, 7 are preferably duplicates of each other, as shown, and the central openings therethrough are of a size to permit them to slide axially upon the periphery of the hub. Keyways 16 are channeled in the inner peripheries of the clamping disks to accommodate not only the driving keys 14, above mentioned, but also the reciprocating keys 17 for actuating one of the clamping disks which latter keys will be further described later on. In the specific construction shown, there are eight of these keyways in each of the clamping disks, four of which are occupied by the driving keys 14, previously described, and four by the said clamping disk actuating keys 17.

The clamping disk actuating levers 18, of which there are four, are T-shaped, as best seen in Fig. 1, comprising each a long operating arm 19 and a cross head forming an outer arm 20 and an inner arm 21. The arms are rounded or semi-cylindrical at their ends for engaging sockets carried respectively by the adjacent clamping disk 7 and the clamping disk actuating keys 17 as described below. The levers 18 are pivoted upon pins 22, extending between ears 23 of pairs of brackets 24, bolted at 25 to the edge or face of the rim of the hub. In the embodiment of the clutch shown, the sockets for the outer arms 20 of the respective levers are formed in socket blocks 27 secured to the adjacent clamping disk by bolts 28 and prevented from turning with respect thereto by dowel pins 35. The inner faces of the socket blocks are recessed to form semi-cylindrical sockets for the ends of lever arms 20 as at 36.

The inner arms of the levers are received in semi-cylindrical bearing sockets 38 formed in the outer faces of the respective clamping disk actuating keys 17.

The keys 17 are of a size and cross section where they extend through the clamping disk 6 to fit snugly within the keyways without binding upon the periphery of the hub, and are formed with outwardly extending lugs 39, 40ª, to embrace the edges of the disk 6. The keys are of somewhat smaller diameter intermediate the lugs 39 and seats 38 so that they may slide freely through the keyways in the clamping disk 7. From the foregoing it will be evident that when the levers 18 are rocked upon the pivot pins 22 they will cause the clamping disks to slide in opposite directions, separating the clamping disks from the friction disk when drawn inwardly, and causing the clamping disks to engage the friction disc when they are forced outwardly.

A double arm comprising the members 40—40 is pivoted upon the same pin 22 which constitutes the fulcrum of each lever, the members 40—40 being arranged respectively on opposite sides of the hub of the lever 18 and between the latter and the respective lugs 23. The free ends of these members are perforated to receive a pin 41, on which are also pivoted the pairs of links 50 and spring bolt 43 hereinafter described. The spring bolt 43 extends loosely through an opening 44 in the free end of lever 18 and through a coiled spring 45, the upper end of which is seated on a washer 46 bearing against the inner face of lever 18, and the lower end of the coiled spring seats upon a washer 47 which bears against a nut 48 on the end of said spring bolt. Manifestly, when the arms 40 are forced outwardly, the levers 18 under the pressure of springs 45 follow them without further compressing the springs until the clamping disks come in contact with the intermediate friction disk when further movement of the levers is prevented. The further movement of the arms 40 causes the compression of springs 45, and the resistance of the springs determines the pressure between the clamping and friction disks.

The arms 40 are operated by double links 50 pivoted at their outer ends to the pins 41, to which reference has previously been made, and at inner ends to pins 51 extending through ribs 52 on the shifting sleeve 53. Sleeve 53 can be adjusted toward and from the clutch by the usual fork (not shown), a groove 54 being formed therein for that purpose. The movement of the sleeve 53 towards the clutch is limited by a spacing sleeve 55 of such length that when the shifting sleeve is moved inward into contact therewith, the links 50 just pass their dead center.

Thus, when the shifting sleeve 53 is forced toward the clutch, the links 50 swing the arms 40 outward, the levers 18 following until the clamping disks are in contact with the friction disk. The final inward movement of the sleeve is accompanied by relatively slight motion of the arms 40 and in the meantime the levers 18 being brought to rest by the engagement of the clamping disks with the friction disk, the springs are put under compression. By properly designing the springs with relation to the other elements and adjusting the nuts on the spring bolts, any desired pressure of the clamping disks against the friction disk may be obtained. With this construction, smooth uniform action of the clutch is obtained, and frequent adjustment for wear, etc., is obviated.

As all of the keyways in the disks are identical, if the keyways engaged by the driving key or keys become worn and enlarged, the key or keys may be replaced and caused to engage unworn keyways of the disks by partially rotating the latter with respect to the hub.

Furthermore the clamping disks being identical in construction may be used on either side of the friction disk, thus avoiding the necessity of keeping more than one file of disks. Again, the extent of gripping surface between the friction disk and the clamping disks may be changed by merely changing the friction disk and clamping plates, or by changing the clamping plates alone, where the diameter of the friction disk is sufficient.

I claim:

1. In a clutch of the class described, a friction disc, a hub, a pair of clamping discs on opposite sides respectively of the friction disk, keyed to the hub for rotation therewith and having limited axial movement with respect thereto, levers connected to the respective clamping disks to cause them to engage and recede from the friction disk, said levers being pivotally supported from the hub, a shifting sleeve, links pivoted to the shifting sleeve and connections including compression springs intermediate said links and the respective levers.

2. In a clutch of the class described, a friction disk, a hub, a pair of clamping disks on opposite sides respectively of the friction disk, keyed to the hub for rotation therewith and having limited axial movement with respect thereto, levers each connected to the clamping disks to cause them to engage and recede from the friction disk, said levers being pivotally supported from the hub, arms pivotally supported from the hub, means connected to the free ends of said arms for operating the latter and connections including compression springs interposed between said arms and levers.

3. In a clutch of the class described, a friction disk, a hub, a pair of clamping disks on opposite sides respectively of the friction disk, keyed to the hub for rotation therewith and having limited axial movement with respect thereto, levers each connected to the respective clamping disks to cause them to engage and recede from the friction disk, said levers being supported from the hub, arms pivotally supported at one end from the hub, a shifting sleeve, links connecting said shifting sleeve and arms, spring bolts connected to said arms and compression springs surrounding said bolts and engaging said levers.

4. In a clutch of the class described, a friction disk, a hub, a pair of clamping disks on opposite sides respectively of the friction disk, keyed to the hub for rotation therewith and having limited axial movement with respect thereto, levers each connected to the respective clamping disks to cause them to engage and recede from the friction disk, said levers pivotally supported from the hub, arms pivoted co-axially with said levers, a shifting sleeve, links connecting said shifting sleeve and arms, spring bolts pivoted to said arms, and coil springs surrounding said bolts and compressed between abutments thereon and the respective levers.

5. In a clutch of the class described, a friction disk, a pair of clamping disks on opposite sides respectively of the friction disk, keyed to the hub for rotation therewith and having limited axial movement with respect thereto, levers each connected to the respective clamping disks to cause them to engage and recede from the friction disk, each lever pivotally supported from the hub, and having an opening in the end thereof, an arm pivoted co-axially with each lever, a spring bolt pivoted to said arm and extending through the opening in the lever, a compression spring surrounding said spring bolt and compressed between an abutment thereon and said lever, a shifting sleeve and links connecting the shifting sleeve and said arm.

6. In a clutch of the class described, a friction disk, a hub, a pair of clamping disks on opposite sides respectively of the friction disk, keyed to the hub for rotation therewith and having limited axial movement with respect thereto, levers pivotally supported on the hub, seats carried by one of said clamping disks engaged by said levers, keys engaging the other said clamping disk and having seats in which said levers are engaged, arms pivotally supported on the hub, a shifting sleeve, links connecting said shifting sleeve and arms, and connecting means including springs intermediate said arms and levers.

In testimony whereof, I have subscribed my name.

WILLIAM J. PEARMAIN.